United States Patent
Nyholm et al.

(10) Patent No.: US 10,110,269 B2
(45) Date of Patent: Oct. 23, 2018

(54) CASE FOR A TABLET SHAPED DEVICE, A METHOD FOR REMOVING A STYLUS THEREFROM AND A METHOD FOR MAKING A CASE FOR A TABLET SHAPED DEVICE

(71) Applicant: STM Management Pty Ltd, Alexandria (AU)

(72) Inventors: Ethan Nyholm, North Bondi (AU); Cambell Smyth, Highgate Hill (AU)

(73) Assignee: STM MANAGEMENT PTY LTD, Alexandria (AU)

( * ) Notice: Subject to any disclaimer, the term of this patent is extended or adjusted under 35 U.S.C. 154(b) by 0 days.

(21) Appl. No.: 15/585,200

(22) Filed: May 3, 2017

(65) Prior Publication Data

US 2017/0346523 A1    Nov. 30, 2017

(30) Foreign Application Priority Data

May 24, 2016 (AU) ................................ 2016100745

(51) Int. Cl.
*H04B 1/3888* (2015.01)
*A45C 11/00* (2006.01)
*H04M 1/02* (2006.01)
*H04M 1/21* (2006.01)
*H04M 1/18* (2006.01)

(52) U.S. Cl.
CPC ............ *H04B 1/3888* (2013.01); *A45C 11/00* (2013.01); *H04M 1/0202* (2013.01); *H04M 1/21* (2013.01); *A45C 2011/002* (2013.01); *A45C 2011/003* (2013.01); *A45C 2200/15* (2013.01); *H04M 1/185* (2013.01)

(58) Field of Classification Search
CPC ..................... H04M 1/185; G06F 2200/1632
See application file for complete search history.

(56) References Cited

U.S. PATENT DOCUMENTS

| | | | |
|---|---|---|---|
| 4,890,759 A * | 1/1990 | Scanga | B65D 17/4011 220/273 |
| 5,996,956 A * | 12/1999 | Shawver | G06F 1/1626 248/309.1 |
| 6,301,101 B1 | 10/2001 | Anzai | |
| 6,626,362 B1 * | 9/2003 | Steiner | G06K 7/10881 235/462.45 |
| 6,772,879 B1 * | 8/2004 | Domotor | A45C 11/00 206/320 |
| 6,985,138 B2 * | 1/2006 | Charlier | G06F 3/0312 178/19.01 |
| 7,318,521 B2 | 1/2008 | Lau | |
| 7,385,596 B2 * | 6/2008 | Lin | G06F 1/1613 178/18.01 |
| 7,843,395 B2 * | 11/2010 | Chen | G06F 1/1626 343/702 |
| 8,132,670 B1 | 3/2012 | Chen | |
| 8,264,310 B2 | 9/2012 | Lauder et al. | |
| 8,344,836 B2 | 1/2013 | Lauder et al. | |
| 8,415,572 B2 * | 4/2013 | Yang | G06F 3/03545 178/19.01 |

(Continued)

*Primary Examiner* — Cindy Trandai
(74) *Attorney, Agent, or Firm* — Eric L. Lane; Green Patent Law (57) ABSTRACT

Disclosed herein is a case for a tablet shaped device, a method for removing a stylus therefrom, and a method for making a case for a tablet shaped device.

5 Claims, 9 Drawing Sheets

(56) References Cited

U.S. PATENT DOCUMENTS

| | | |
|---|---|---|
| 8,474,609 B1 | 7/2013 | Hong et al. |
| 8,607,976 B2 | 12/2013 | Wu et al. |
| 8,672,126 B2 | 3/2014 | Rohrbach et al. |
| 8,714,351 B2 | 5/2014 | Toulotte |
| 8,724,300 B2 | 5/2014 | Smith et al. |
| 8,746,446 B2 | 6/2014 | Chiang |
| 8,807,333 B1 | 8/2014 | Cooper et al. |
| 8,817,457 B1 | 8/2014 | Colby et al. |
| 8,817,466 B2* | 8/2014 | Xie .................. G06F 1/1626 178/19.01 |
| 8,878,637 B2 | 11/2014 | Sartee et al. |
| 8,928,437 B2 | 1/2015 | Lauder et al. |
| 9,215,303 B2 | 12/2015 | Nyholm et al. |
| 9,225,814 B2 | 12/2015 | Nyholm et al. |
| 9,226,567 B2 | 1/2016 | Potter |
| 9,327,544 B2* | 5/2016 | Ceruzzi ............. B43K 23/001 |
| 9,395,753 B2* | 7/2016 | Amano .............. G06F 1/1626 |
| 9,489,060 B2* | 11/2016 | Ashcraft ............ G06F 1/1626 |
| 9,552,083 B2* | 1/2017 | Chen ................. G06F 3/03545 |
| 9,748,999 B2* | 8/2017 | Nyholm ............. H04B 1/3888 |
| 9,755,688 B1 | 9/2017 | McKenzie .......... H04B 1/3888 |
| 2004/0240164 A1 | 12/2004 | Lee |
| 2006/0007645 A1 | 1/2006 | Chen et al. |
| 2006/0044288 A1* | 3/2006 | Nakamura ......... G06F 1/1626 345/179 |
| 2006/0091222 A1* | 5/2006 | Leung ............... G06F 1/1626 235/486 |
| 2006/0133015 A1* | 6/2006 | Lin .................... G06F 1/1613 361/679.26 |
| 2007/0035938 A1* | 2/2007 | Rochford .......... H05K 9/0035 361/816 |
| 2007/0279853 A1* | 12/2007 | Hung ................. G06F 1/1609 361/679.26 |
| 2008/0265533 A1* | 10/2008 | Perkovich ......... A63C 17/062 280/11.221 |
| 2010/0021022 A1* | 1/2010 | Pittel ................ G06F 3/03545 382/123 |
| 2010/0165570 A1* | 7/2010 | Zuo ................... G06F 1/1626 361/679.58 |
| 2010/0269308 A1* | 10/2010 | Huang ............... G06F 1/1626 24/300 |
| 2011/0285671 A1* | 11/2011 | Wu .................... G06F 3/0487 345/179 |
| 2012/0014043 A1* | 1/2012 | Dong ................. H04M 1/0283 361/679.01 |
| 2012/0088557 A1 | 4/2012 | Liang |
| 2012/0153116 A1* | 6/2012 | Harrison ............ A47B 23/044 248/460 |
| 2012/0268891 A1 | 10/2012 | Cencioni |
| 2013/0048514 A1 | 2/2013 | Corcoran et al. |
| 2013/0050922 A1* | 2/2013 | Lee .................... G06F 1/1656 361/679.02 |
| 2013/0268891 A1 | 10/2013 | Finley et al. |
| 2013/0335903 A1* | 12/2013 | Raken ............... G06F 1/1613 361/679.4 |
| 2014/0029183 A1* | 1/2014 | Ashcraft ............ G06F 1/26 361/679.4 |
| 2014/0077669 A1* | 3/2014 | Choi .................. G06F 1/1626 312/223.1 |
| 2015/0001105 A1 | 1/2015 | Nyholm et al. |
| 2015/0014214 A1* | 1/2015 | Richardson ....... G06F 1/1626 206/591 |
| 2015/0111621 A1* | 4/2015 | Smith ................ H04B 1/3888 455/575.1 |
| 2015/0116286 A1* | 4/2015 | Stewart ............. G06F 3/03545 345/179 |
| 2015/0201053 A1 | 7/2015 | Nyhoim et al. |
| 2015/0263776 A1 | 9/2015 | Shyu |
| 2015/0309544 A1* | 10/2015 | McCracken ....... G06F 1/182 220/826 |
| 2015/0349831 A1* | 12/2015 | Young ............... H04B 1/3888 455/575.8 |
| 2016/0018854 A1* | 1/2016 | Yu ..................... G06F 1/1669 361/679.08 |
| 2016/0065262 A1* | 3/2016 | Wilson .............. H04B 1/3888 455/575.8 |
| 2017/0005687 A1 | 1/2017 | Nyholm et al. |
| 2017/0097698 A1* | 4/2017 | Maeshima ........ G06F 3/03545 |

* cited by examiner

CASE FOR A TABLET SHAPED DEVICE, A METHOD FOR REMOVING A STYLUS THEREFROM AND A METHOD FOR MAKING A CASE FOR A TABLET SHAPED DEVICE

TECHNICAL FIELD

The disclosure herein generally relates to a case for a tablet shaped device, a method for removing a stylus therefrom, and a method for making a case for a tablet shaped device.

BACKGROUND

Cases for tablet shaped devices, examples of which include the APPLE IPAD, SAMSUNG GALAXY TAB, smartphones like the APPLE IPHONE, and some personal digital assistants, are commercially available. Some electronic tablet shaped devices have a touch screen and come with a stylus for drawing or writing on the touchscreen.

The commercially available cases for tablet shaped devices may not meet some of the needs of consumers, and may be more difficult and/or costly to manufacture than is desirable.

SUMMARY

Disclosed herein is a case for a tablet shaped device. The case comprises a body comprising a face having a tablet shaped device receiving area. The case comprises a stylus holder at a margin of the face for holding a stylus for the tablet shaped device. The stylus holder defines an elongate cavity for receiving the stylus. The stylus holder comprises at least one obstructing element arranged to obstruct removal of the stylus from the elongate cavity when so received.

In an embodiment, the stylus holder may be configured such that the stylus is below the face when so held. This may protect the stylus, which may be delicate and expensive.

In an embodiment, the at least one obstructing element is attached to an elongate cavity wall. The elongate cavity wall may be outwardly bendable and resilient. The at least one obstructing element attached to the cavity wall may be outwardly movable for removal of the stylus from the elongate cavity.

In an embodiment, a discontinuity in the elongate cavity wall provides finger access to the stylus when so received.

In an embodiment, the elongate cavity wall is integral to the body.

In an embodiment, the at least one obstructing element protrudes into the elongate cavity.

In an embodiment, wherein the at least one obstructing element comprises at least one rib. The at least one rib may be longitudinally orientated with respect to the elongate cavity.

An embodiment comprises another at least one obstructing element. The at least one obstructing element and the other at least one obstructing element may be distributed between opposite sides of the elongate cavity.

In an embodiment, the face is a rectangular face. The margin may be adjacent an edge of the rectangular face. The edge may be longer than another edge of the rectangular face.

Disclosed herein is a method for removing a stylus for a tablet shaped device from a case for the tablet shaped device. The method comprises moving the stylus towards an opening of an elongate cavity in which the stylus is received with a finger at a discontinuity in an elongate cavity wall having attached thereto an obstructing element arranged to obstruct removal of the stylus from the elongate cavity. The stylus so moved engages an obstructing element arranged to obstruct removal of the stylus from the elongate cavity when so received and outwardly move the obstructing element for removal of the stylus.

In an embodiment, the elongate cavity wall outwardly bends when the obstructing element is outwardly moved and subsequently springs back when the stylus is removed from the tablet shaped device.

In an embodiment, a plurality of legs are located at another face of the body. The body may warp or distort during or subsequent to manufacture. The plurality of legs may provide stability when the warped body is placed on a flat surface. The legs may significantly relax manufacturing tolerances—for example the flatness of the rear—which may assist in the control of manufacturing costs.

In the context of the present application, the term stylus encompasses a hand-held tool used by a user to interact with a touch sensitive area (for example a touch sensitive screen) of the tablet shaped device. An example of a stylus may, but not necessarily, comprise an elongated shaft having opposite ends and a touch sensitive area interaction point at at least one of the opposite ends. The point may be rounded. A stylus may be active, passive, or haptic, for example.

Any of the various features of each of the above disclosures, and of the various features of the embodiments described below, can be combined as suitable and desired.

BRIEF DESCRIPTION OF THE FIGURES

Embodiments of a case for a tablet computer will now be described by way of example only with reference to the accompanying figures in which.

DESCRIPTION OF EMBODIMENTS

The FIGS. 1-8 show various views of a case for a tablet shaped device in the form of a case for an electronic tablet shaped device, the case being generally indicated by the numeral 10. The case 10 comprises a body 12 comprising a face 14 having a tablet shaped device receiving area 18. The case 10 comprises a stylus holder 20 at a margin 22 of the face 14 for holding a stylus (e.g. Apple Pencil) for the tablet shaped device. The stylus holder 20 defines an elongate cavity 24 in the form of a groove for receiving the stylus. The stylus holder 20 comprises at least one obstructing element 26 arranged to obstruct removal of the stylus from the elongate cavity 24 when so received.

The stylus holder 20 is configured such that the stylus is below the face when so held. The depth of the bottom 27 of the elongate cavity is, in this but not all embodiments, at least (and may be greater than) a transverse dimension of the stylus or another stylus usable on a tablet shaped device receivable by the case for a tablet shaped device 10.

The at least one obstructing element 26 is attached to an elongate cavity wall 28 in the form of an outer edge cavity wall. The elongate cavity wall 28 can be outwardly bent and is resilient. The elongate wall may be bent in a direction orthogonal to a normal to the face 14. Alternatively or additionally, the obstructing element may be resilient. The at least one obstructing element 26 attached to the cavity wall 28 is outwardly movable, when the cavity wall 28 bends outwardly, for removal of the stylus from the elongate cavity 24. A discontinuity 30 in the elongate cavity wall 28 provides finger access to the stylus when so received. The discontinuity may cut into the bottom wall 27 of the elongate cavity 24. The discontinuity is intermediate opposite edges of the case 10, in this embodiment located at the centre of the margin 22.

In this but not all embodiments, the elongate cavity wall 28 is integral to the body 12. The at least one obstructing element 26 protrudes into the elongate cavity 24, however it may alternatively be above the elongate cavity 24.

The at least one obstructing element 26 comprises at least one rib 26, however the at least one obstructing element may take the form of a bump, bulge or generally any suitable form. The at least one rib 26 is longitudinally orientated with respect to the elongate cavity 24, however it may not be in an alternative embodiment. In this but not necessarily all embodiments, the rib 26 is located at an edge of the elongate cavity to form a lip. The at least one obstructing element 26 and another at least one obstructing element 34 are distributed between opposite sides 36,38 of the elongate cavity 24.

The face 14 is a rectangular face 14, notwithstanding rounded corners. The margin 22 is adjacent an edge 40 of the rectangular face 14 that is longer than another edge 42 of the rectangular face 14.

An embodiment of a method for removing the stylus for the tablet shaped device from a case 10 for the tablet shaped device will now be described. The stylus is moved towards an opening 44 of the elongate cavity 24 in which the stylus is received with a finger at the discontinuity 30 in the elongate cavity wall 28 having attached thereto an obstructing element 26 arranged to obstruct removal of the stylus from the elongate cavity 24. The stylus so moved engages the obstructing element 26 arranged to obstruct removal of the stylus from the elongate cavity 24 when so received and outwardly move the obstructing element 26 for removal of the stylus.

The elongate cavity wall 28 outwardly bends when the obstructing element 26 is outwardly moved and subsequently springs back when the stylus is removed from the tablet shaped device.

In this but not necessarily all embodiment, the body has a perimeter wall 46 and a rear wall 48 that protect the tablet shaped device when so received by the tablet shaped device receiving area 18. The perimeter wall 46 and the rear wall 48 have a plurality of optional ports 50 for cable or other access to the tablet shaped device when received.

The perimeter wall 46 has a resilient lip 53 located at a distal end thereof. The perimeter wall 46 and the tablet shaped device receiving area 18 define a cavity in which the tablet shaped device is held by the resilient lip 53. The opening of the cavity is constricted by the resilient lip 53. The tablet shaped device may be inserted into the cavity by squeezing it through the opening defined by the resilient lip 53. The resilient lip 53 deforms to accommodate the passage of the tablet shaped device, and recoils back into shape subsequent to passage of the tablet shaped device. In another embodiment the tablet shaped device may be held to the tablet shaped device receiving area 18 by at least one elastic strap or generally by any suitable fastener.

The tablet shaped device receiving area 18 has an optional inner lining in the form of a inner felt lining. The inner lining provides a relatively soft surface to reduce scratching of the tablet shaped device. Other embodiments may not have an inner lining or may have another suitable lining material.

Figure 1:
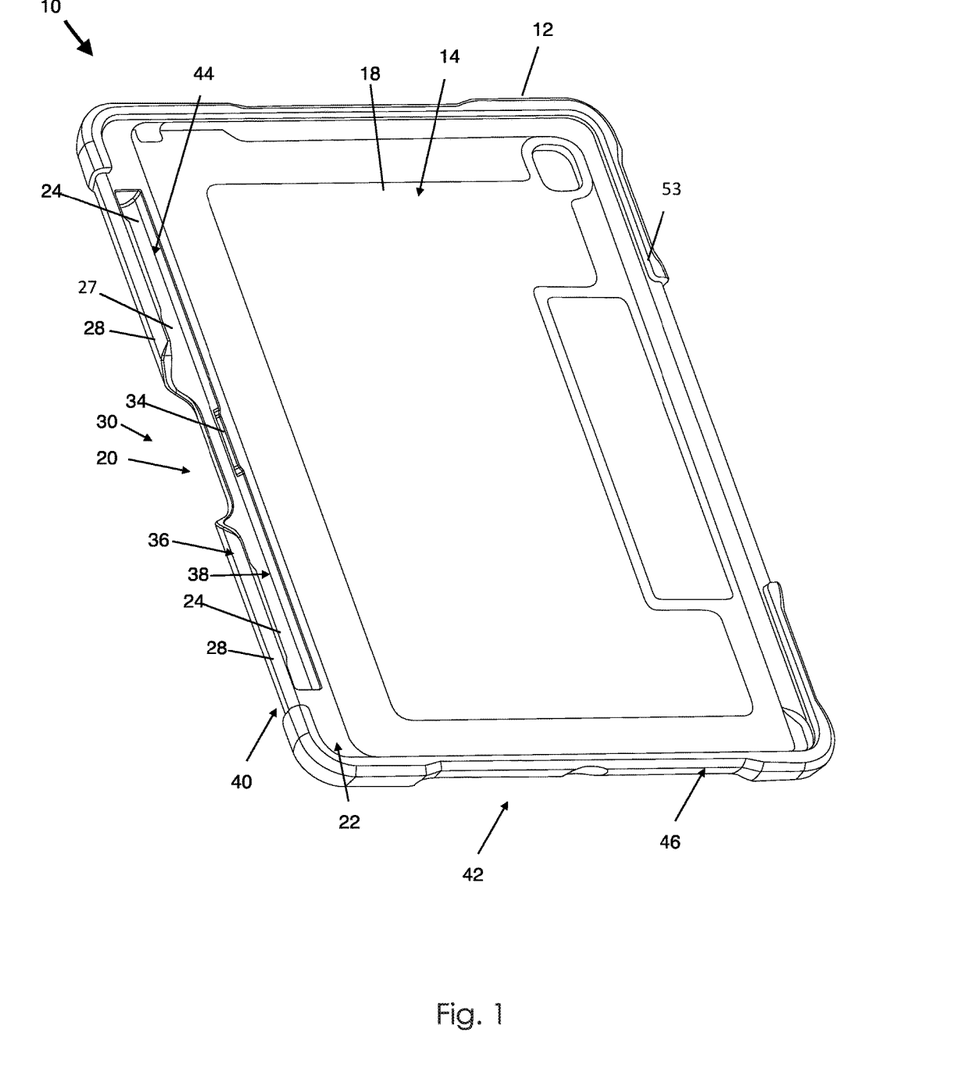
FIG. 1 shows a front bottom isometric view of an embodiment of a case for a tablet computer.
Figure 2:
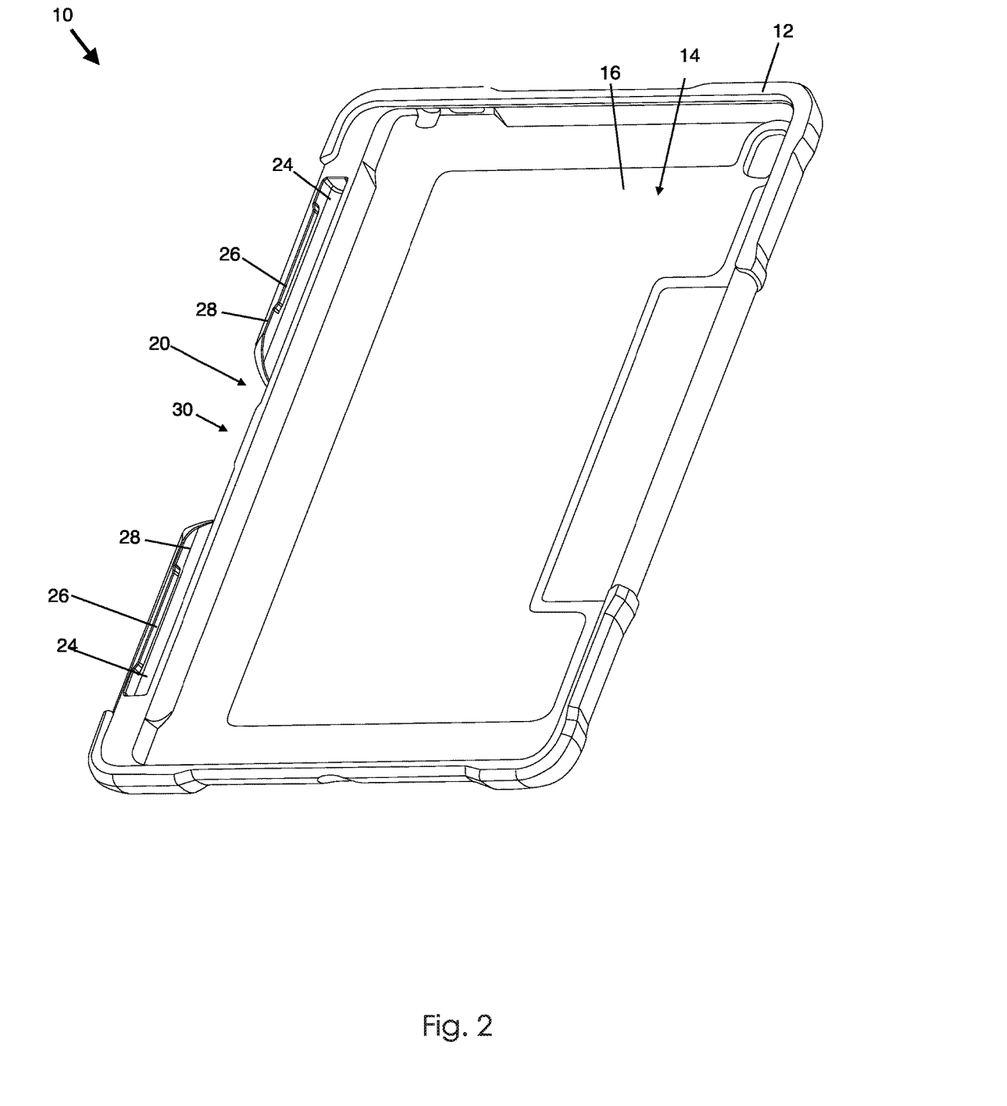
FIG. 2 shows another side front bottom isometric view of the case for the tablet computer.
Figure 3:
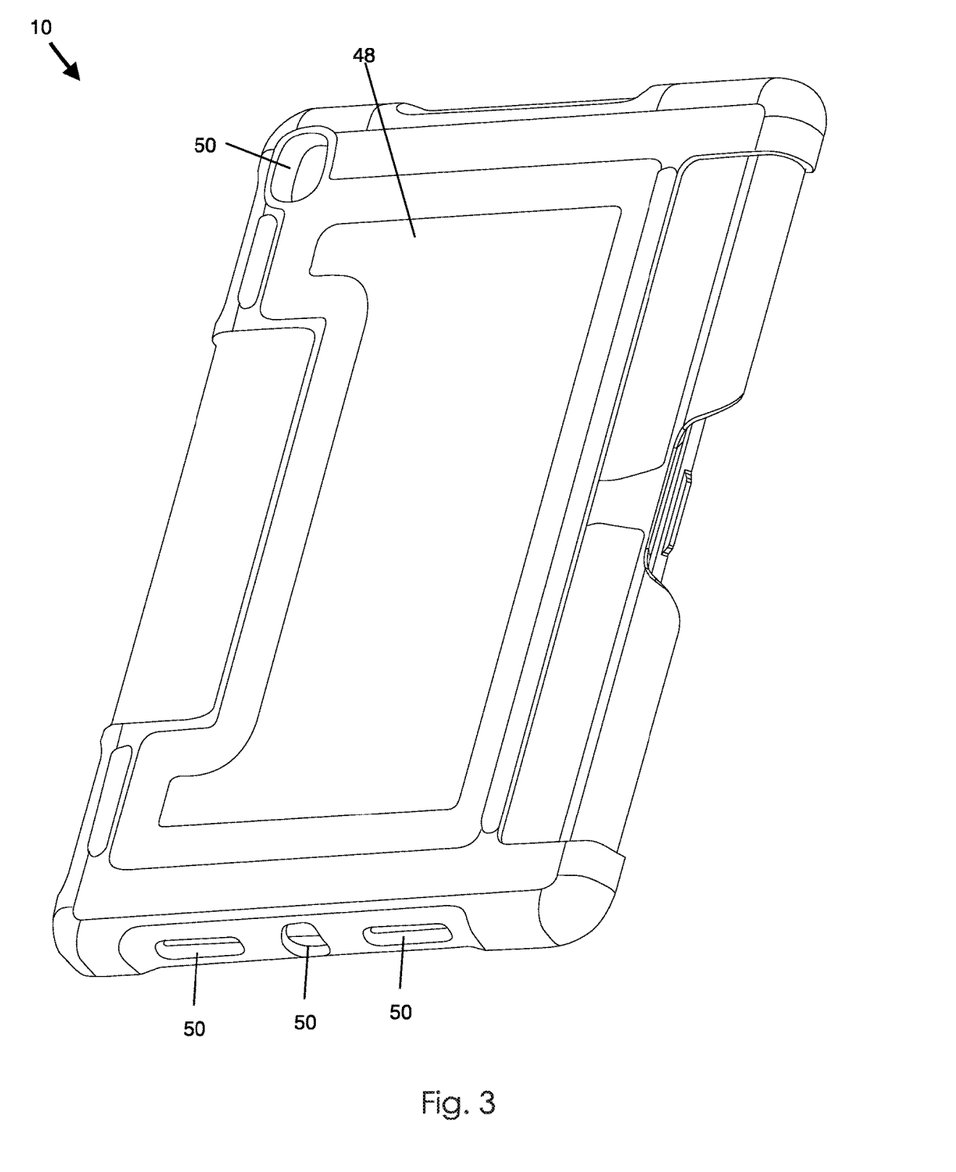
FIG. 3 shows a rear bottom isometric view of the case for the tablet computer.
Figure 4:
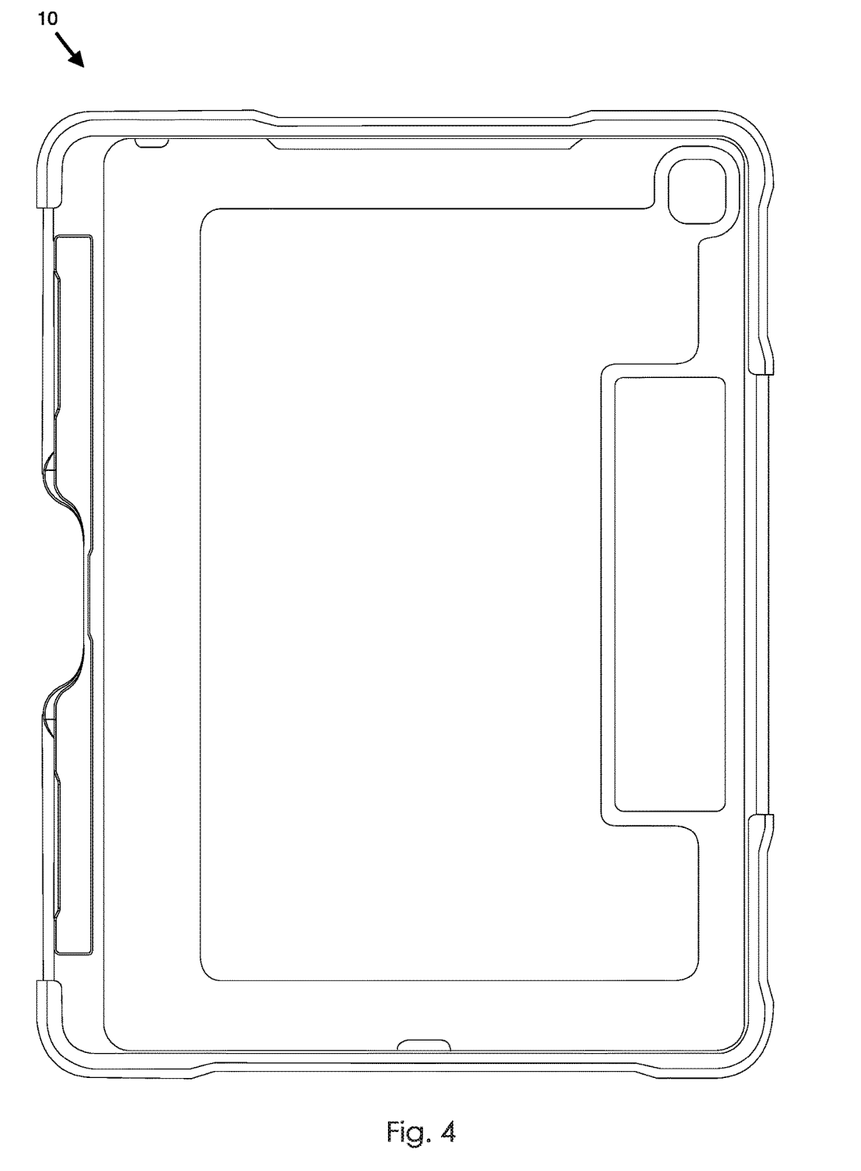
FIG. 4 shows a top view of the case for the tablet computer.
Figure 5:
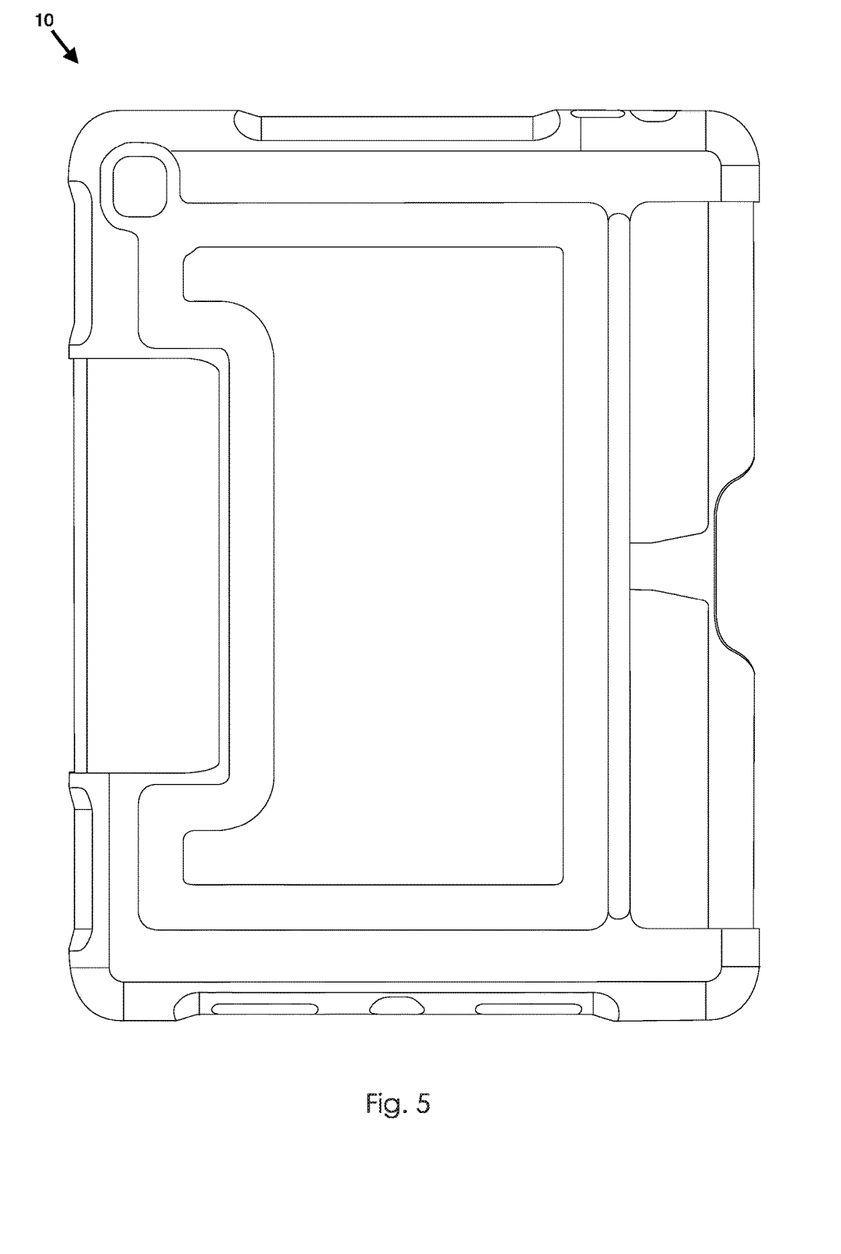
FIG. 5 shows a rear view of the case for the tablet computer.
Figure 6:
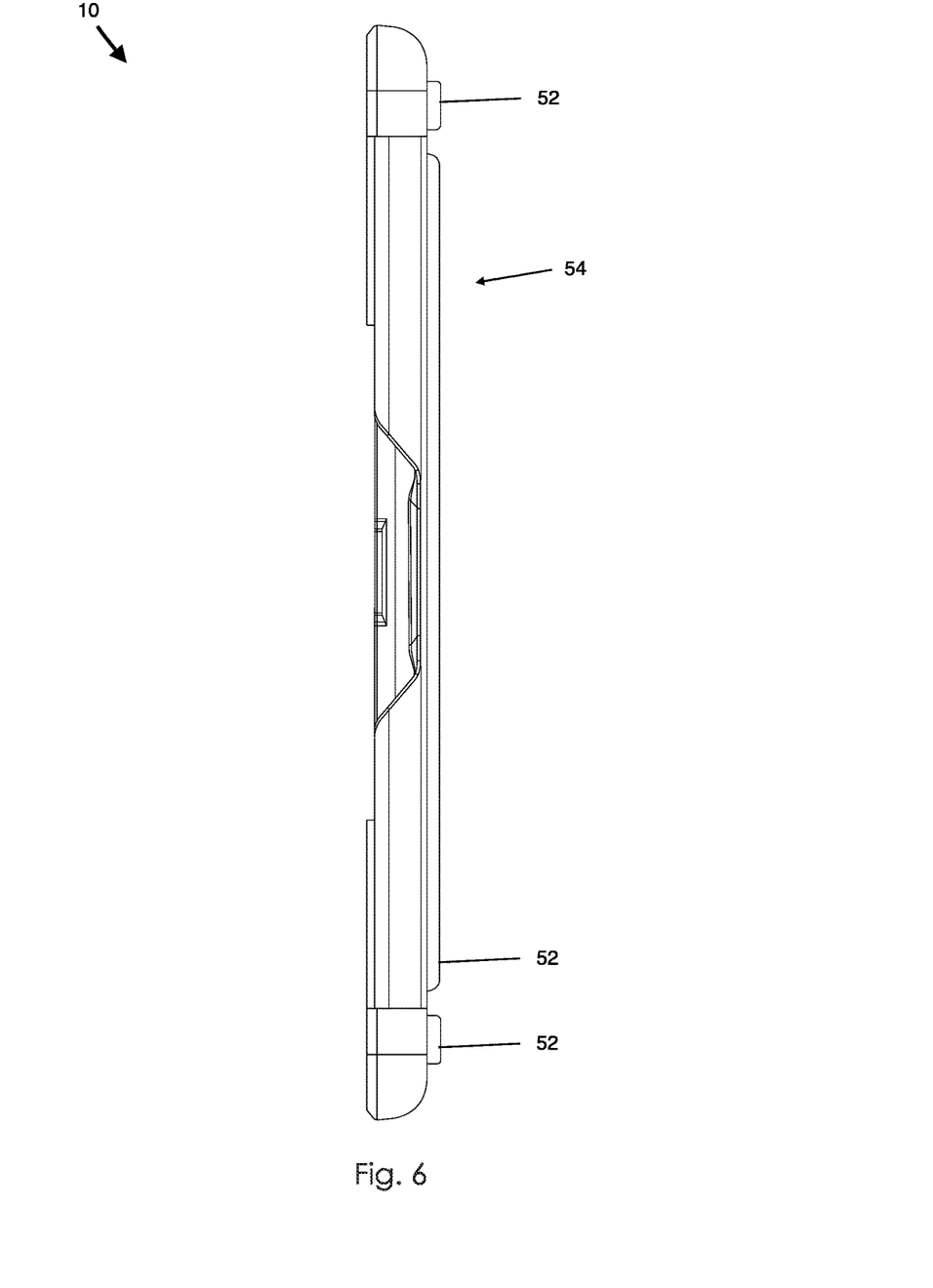
FIG. 6 shows a left side view of the case for the tablet computer.
Figure 7:
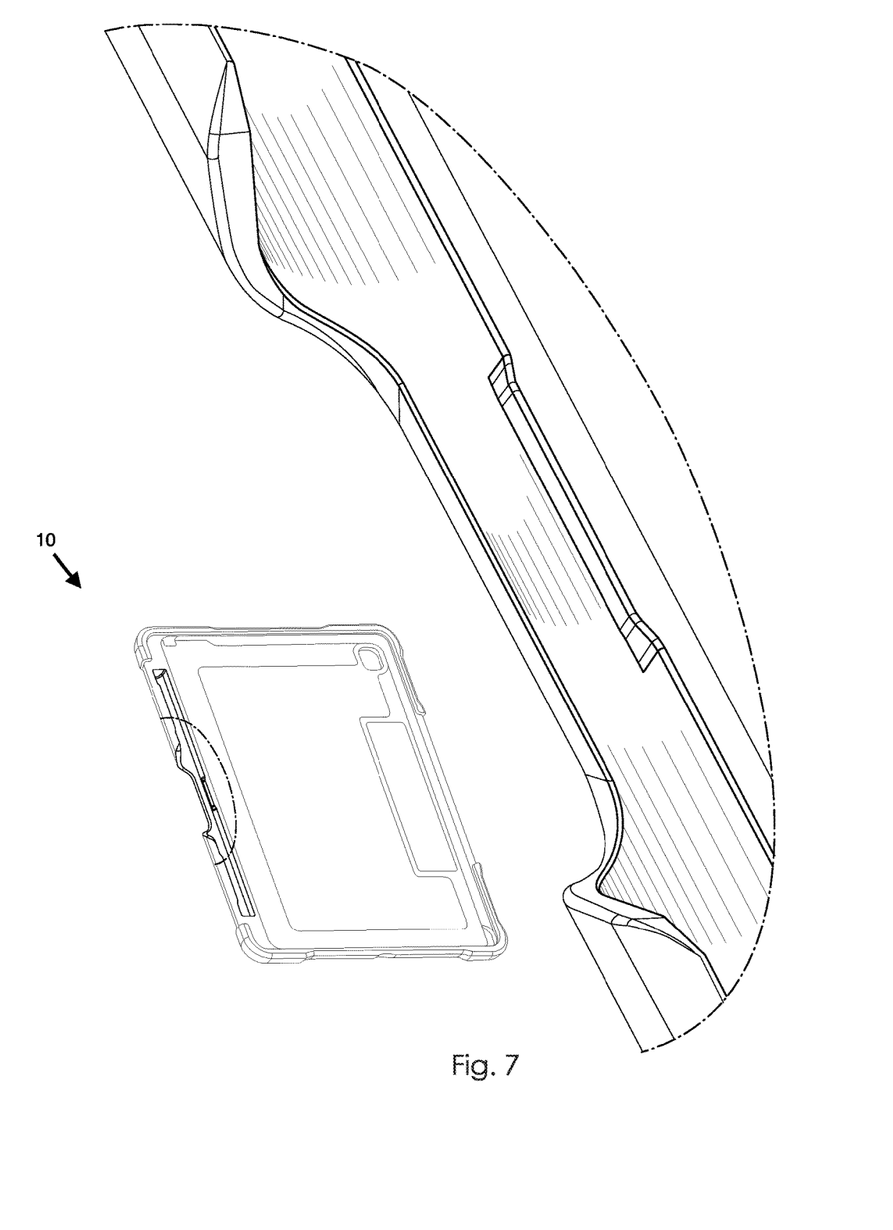
FIG. 7 shows a detail of the case for the tablet computer.
Figure 8:
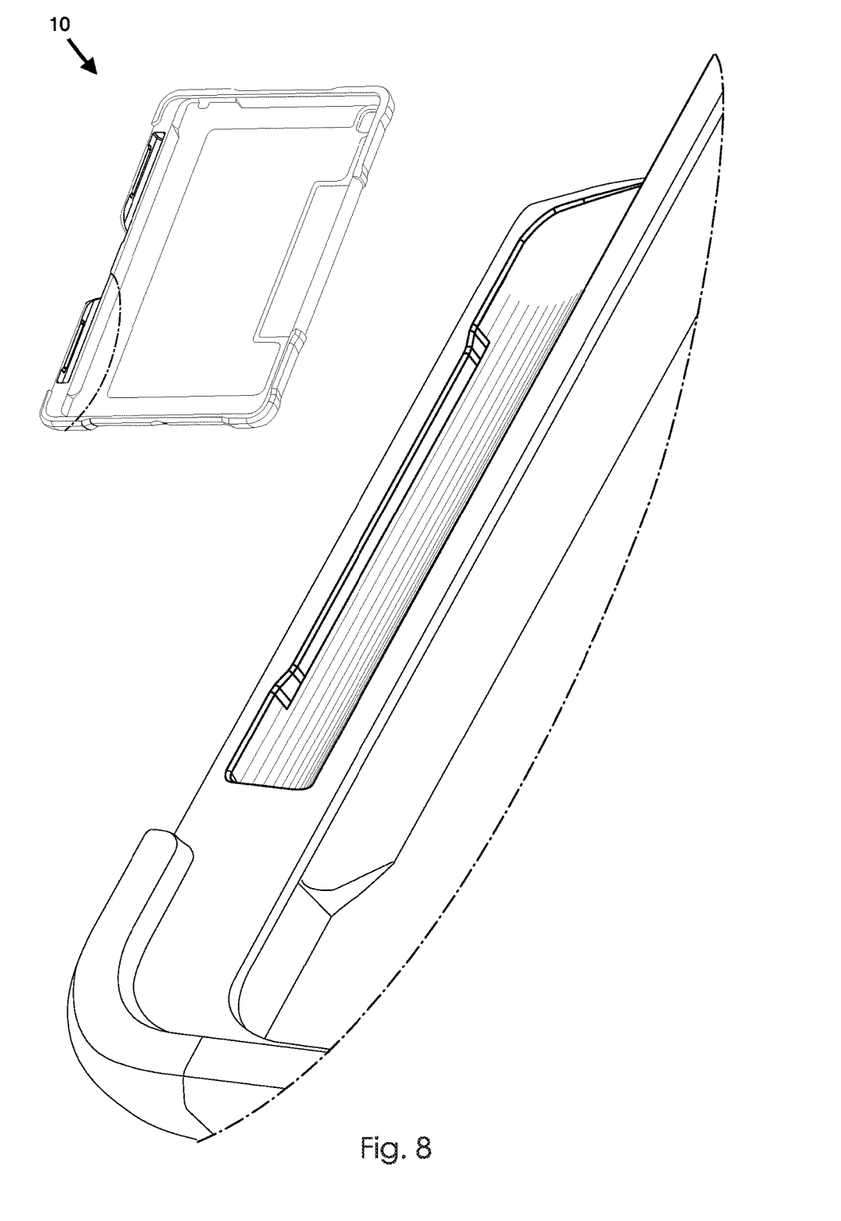
FIG. 8 shows another detail of the case for the tablet computer.

The rear of the body 12 has another face 54 that has a plurality of legs 52 projecting therefrom. The legs 52 provide stability when the case 10 is resting on a flat surface with the legs 52 on the flat surface. The surface may be, for example, a bench top table top, or any other suitable surface at which a user may place the case and use the tablet shaped device held therein.

The case 10 may be made using generally any suitable method. An embodiment of making a case for a tablet shaped device has the step of forming a body comprising at least a first material. The step of forming the body may comprise forming the body by an injection moulding process. At least one polymer—for example a polyurethane, polycarbonate or generally any suitable polymer—may be injected into a mould configured for production of the body. The illustrated embodiment has a body formed by injection moulding. The body has a polycarbonate exterior and a polyurethane interior. The polyurethane is relatively soft for receiving the tablet shaped device. The relatively resilient polyurethane facilitates insertion and removal of the device and providing a degree of shock resistance against knocks and falls. The polycarbonate exterior forms a hard protective shell.

Figure 9:
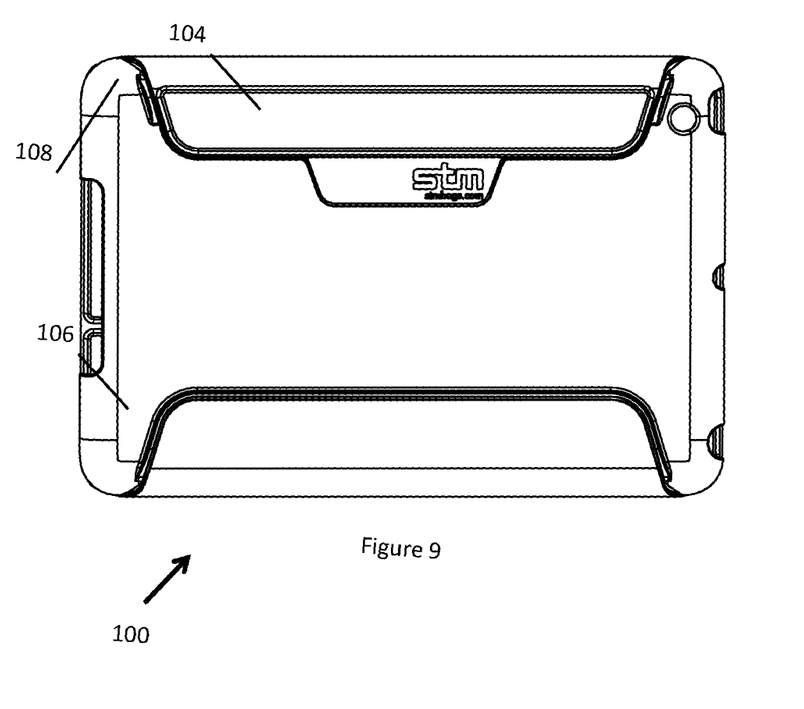
FIGS. 9 and 10 show rear and front perspective views of another embodiment of a case for a tablet computer that has a flap.
Figure 10:
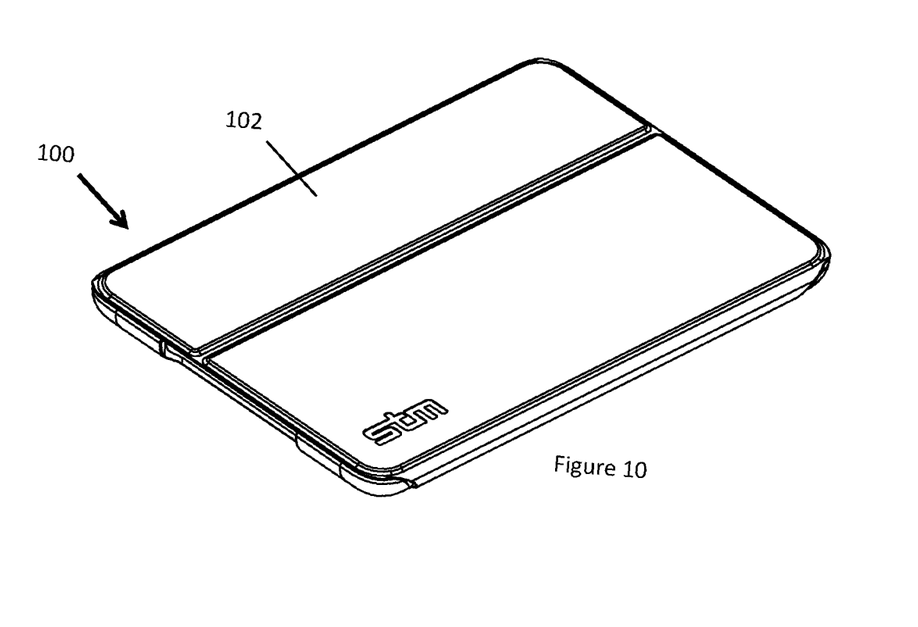

FIGS. 9 and 10 show rear and front perspective views of another embodiment of a case for a tablet computer 100 that has a flap 102. The case 100 is generally identical to the case 10 of FIGS. 1-8 unless otherwise described or illustrated. The flap 102 comprising a distal portion 104 in the form of a wing that is magnetically attracted to the body 106, and configurable between a first configuration in which the flap covers the tablet shaped device receiving area and the distal portion 104 is wrapped around an edge 108 of the body 106 and contacts the back face such that the flap is secured by the magnetic attraction of the distal portion 108 to the body 106, and a second configuration in which the flap 102 is folded to form a stand secured by the magnetic attraction of the distal portion 104 to the body.

When the flap 102 is in the first configuration, it protects a front of the tablet shaped device when received by the receiving area. The case 100, when the flap 102 is in the second configuration, supports the tablet shaped device when received at an elevated angle with respect to a case supporting surface.

Securement of the flap 102 by the magnetic attraction may facilitate relatively easy and rapid reconfiguration between the first configuration and the second configuration.

The distal portion 104 comprises a distal portion magnet having a magnetic orientation in the first configuration that is reversed in the second configuration. The distal portion magnet may be attracted to a first body magnet in the first configuration and, in the second configuration, to a second body magnet having a magnetic orientation that is reversed with respect to the first body magnet.

In the second configuration the flap is folded and located at the first face. The flap comprises a first rigid sheet that in the second configuration is a base of the stand. The flap may comprise a second rigid sheet that in the second configuration is a brace of the stand.

Variations and/or modifications may be made to the embodiments described without departing from the spirit or ambit of the invention. The present embodiments are, therefore, to be considered in all respects as illustrative and not restrictive. Reference to a feature disclosed herein does not mean that all embodiments must include the feature.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A case for a tablet shaped device, the case comprising:
a body comprising a face having a tablet shaped device receiving area, the body having an elongate cavity opening thereon for an elongate cavity at a margin of the face for holding a stylus for the tablet shaped device, the body comprising an elongate cavity wall defining the outer edge of the elongate cavity and which is outwardly bendable; and
at least one obstructing element arranged to obstruct removal of the stylus from the elongate cavity when so received, the at least one obstructing element being outwardly movable by outwardly bending the elongate cavity wall for removal of the stylus from the elongate cavity.

2. A case for a tablet shaped device defined by claim 1 wherein the elongate cavity wall is integral with the body.

3. A case defined by claim 1 wherein a discontinuity in the elongate cavity wall provides finger access to the stylus when so received.

4. A method for removing a stylus for a tablet shaped device from a case for the tablet shaped device, the case comprising a body comprising a face having a tablet shaped device receiving area, the body having an elongate cavity opening thereon for an elongate cavity at a margin of the face for holding a stylus for the tablet shaped device, the body comprising an elongate cavity wall defining the outer edge of the elongate cavity and which is outwardly bendable and at least one obstructing element arranged to obstruct removal of the stylus from the elongate cavity when so received, the at least one obstructing element being outwardly movable by outwardly bending the elongate cavity wall for removal of the stylus from the elongate cavity; the method comprising:
moving the stylus towards the elongate cavity opening in which the stylus is received with a finger at a discontinuity in the elongate cavity wall having attached thereto the at least one obstructing element, wherein the stylus so moved engages the at least one obstructing element when so received and outwardly moves the at least one obstructing element for removal of the stylus.

5. A method defined by claim 4 wherein the elongate cavity wall outwardly bends when the obstructing element is outwardly moved and subsequently springs back when the stylus is removed from the tablet shaped device.

* * * * *